Nov. 21, 1967 A. A. VALDETTARO ET AL 3,353,878

TUNER SHAFT MOUNTING ARRANGEMENT

Filed Dec. 6, 1965

INVENTORS
ALARICO A. VALDETTARO,
JIMMIE E. WARTHAN AND
CLIFTON C. PERRY by

Mason, Kolehmainen, Rathburn and Wyss
ATTORNEYS

United States Patent Office 3,353,878

Patented Nov. 21, 1967

3,353,878

TUNER SHAFT MOUNTING ARRANGEMENT

Alarico A. Valdettara, Bloomington, and Jimmie E. Warthan, Stinesville, and Clifton C. Perry, Bloomington, Ind., assignors to Sarkes Tarzian, Inc., Bloomington, Ind., a corporation of Indiana Filed Dec. 6, 1965, Ser. No. 511,845

7 Claims. (Cl. 308—24)

The present invention relates to television tuners, and, more particularly, to an improved arrangement for mounting the rotatable control shaft of such tuners.

All television tuners utilize a station selector shaft which is rotated to select different television channels and many different arrangements have been heretofore proposed for mounting the selector shaft for rotation within a shielded compartment. This station selector shaft should be mounted in such manner that there is a minimum of friction or drag on the shaft when it is rotated and also the shaft should be accessible from the exterior of the shielded compartment so that it can be rotated by grasping a knob secured to the shaft, or the like. In addition, in many tuners which are used for UHF, portions of the tuned circuits of the tuner, such as, for example, variable capacitor plates, are carried by the station selector shaft itself, and it is necessary to provide a good electrical ground for the shaft while at the same time providing a mounting arrangement whereby the shaft is freely rotatable.

In many prior art tuner arrangements, the selector shaft is mounted by means of a single ball bearing at one end of the shaft and a ring of ball bearings positioned in a suitable race in the opposite wall of the tuner through which the selector shaft extends to the exterior of the tuner for control purposes. While such a ball bearing type of mounting is satisfactory to provide for low friction rotation of the shaft, it is not entirely suitable to provide an adequate electrical ground, and in many instances it is necessary to provide a separate grounding strap which rides on the shaft adjacent the ball bearing to provide the necessary electrical ground. Also, in some instances the ball bearings themselves have been silver plated in order to provide a lower electrical impedance to ground through the ball bearing assembly.

It is, therefore, an object of the present invention to provide a new and improved tuner shaft mounting arrangement which is extremely simple in construction, may be readily assembled on a mass production basis and provides adequate electrical grounding of the shaft at both ends thereof.

It is a further object of the present invention to provide a new and improved tuner shaft mounting arrangement wherein a single resilient element is employed adjacent one wall of the tuner which includes a spring biased arm portion which engages the tuner shaft adjacent said one wall and biases the shaft into engagement with both first and second bearing surfaces on opposite walls of the tuner.

It is a still further object of the present invention to provide a new and improved tuner shaft mounting arrangement wherein a single spring clip is employed to bias the selector shaft of the tuner into engagement with both first and second bearing surfaces on opposite walls of the tuner, this spring clip engaging the selector shaft only adjacent one wall of the tuner.

It is another object of the present invention to provide a new and improved tuner shaft mounting arrangement wherein a single resilient member is employed to bias the selector shaft of the tuner into engagement with both first and second bearing surfaces on opposite walls of the tuner, and said member is arranged to retain the selector shaft and prevent inadvertent removal thereof.

The invention, both as to its organization and method of operation, together with further objects and advantages thereof, will best be understood by reference to the following specification taken in connection with the accompanying drawings in which.

Figure 1:
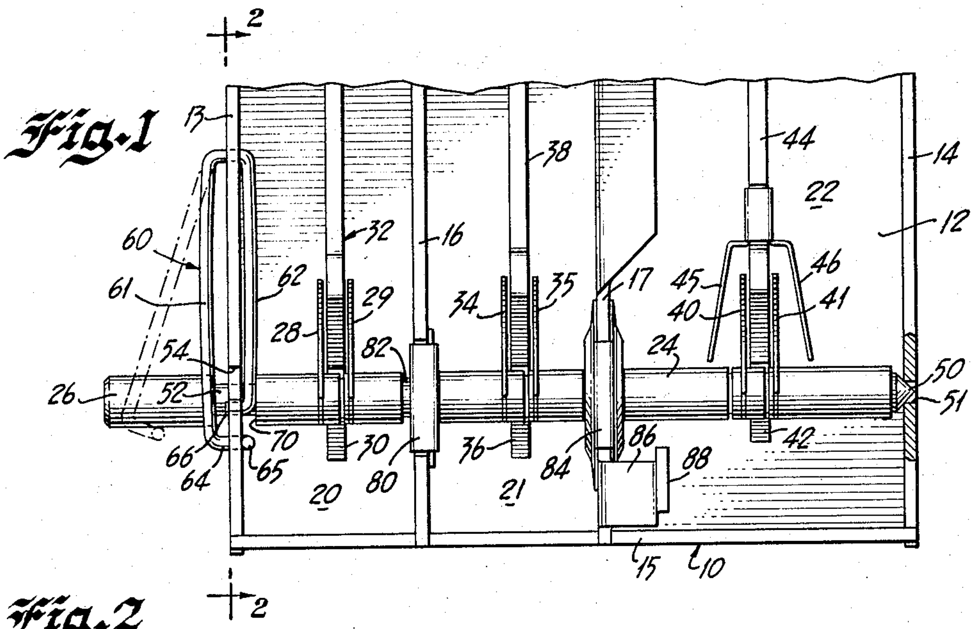
FIG. 1 is a fragmentary plan view of a UHF tuner embodying the tuner shaft mounting arrangement of the present invention.

Referring now to the drawings, the tuner shaft mounting arrangement of the present invention is therein illustrated in conjunction with a UHF tuner indicated generally at 10. The tuner 10 is provided with a bottom wall 12 and side walls 13, 14 and 15 which form the main chassis of the UHF tuner. A pair of intermediate divider walls 16 and 17 are provided so as to define a plurality of tuning compartments 20, 21 and 22. Customarily, a metal cover is provided which contacts all of the upper surfaces of the walls 13 to 17, inclusive, so as to provide completely shielded compartments 20, 21 and 22, as will be readily understood by those skilled in the art.

The station selector shaft 24 of the tuner 10 is arranged to extend through the compartments 20, 21 and 22, the left-hand portion 26 of the shaft 24 extending beyond the left-hand wall 13 of tuner 10 so that the shaft 24 can be rotated by providing a suitable knob or gear train connected to the extension 26.

In the illustrated embodiment, the selector shaft 24 carries a plurality of capacitative tuning elements which are associated with the different UHF tuned circuits in each of the compartments 20, 21 and 22. More particularly, the shaft 24 carries a pair of capacitor plates 28 and 29 which cooperate with a fixed capacitor plate 30 formed at the free end of a transmission line tuning element indicated generally at 32, the other end of which is secured to a wall of the tuner. In a similar manner, in the compartment 21 the capacitor plates 34 and 35 are mounted on the selector shaft 24 and cooperate with a fixed capacitor plate 36 which forms a part of a transmission line tuning element 38 positioned within the compartment 31. In the compartment 22 the oscillator tuning portion of the tuner is located, and the capacitor plates 40 and 41 are secured to the tuner shaft 24 and cooperate with a fixed capacitor plate 42 which is formed on one end of the transmission line element 44. A second pair of fixed capacitor plates 45 and 46 may also be provided to cooperate with the rotatable plates 40 and 41 to obtain the correct tuning characteristic for the oscillator section of the tuner, as will be readily understood by those skilled in the art.

Referring now more particularly to the tuner shaft mounting arrangement of the present invention, the right-hand end of the selector shaft 24 (as viewed in FIG. 1) is provided with a conical surface of revolution 50 which is seated in an opening 51 in the side wall 14 of the tuner 10.

The portion of the shaft 24 in the vicinity of the opposite wall 13 of the tuner 10 is provided with a neck portion 52 of reduced cross section. The wall 13 is provided with a top opening notch 54 (FIG. 2) therein and the bottom portion of this notch is provided with a semicircular bearing portion 56 which is adapted to receive the neck portion 52 when this portion of the shaft is moved downwardly through the notch 54 during assembly of the tuner.

Each of the partitions 16 and 17 is also provided with a notch extending downwardly from the top edge thereof to accommodate the tuning shaft 24 with the capacitor plates assembled thereon. Thus, the tuning shaft 24 with the capacitor plates described above assembled thereto, is first inserted into the opening 51 in the wall 14 and the left-hand end thereof is then moved downwardly within the slot 54 in the wall 13. During this operation, the capacitor plates 28, 29, 34, 35, 40 and 41, which are of semicylindrical configuration, are positioned so that they will clear the fixed capacitor plates 30, 36 and 42.

In accordance with an important aspect of the present invention, a single resilient spring clip is employed to provide the necessary biasing force in two mutually perpendicular directions so as to hold the shaft 24 against the bearing surfaces provided therefor while at the same time providing a good electrical ground at both ends of the selector shaft 24. This resilient spring clip must provide a biasing force along the length of the shaft in the right-hand direction as viewed in FIG. 1 so that the conical point 50 is urged into engagement with the edge of the opening 51. At the other end of the shaft 24, the neck portion 52 must be held downwardly against the semicircular seat 56 provided at the bottom of the notch 54.

Figures 5, 6:
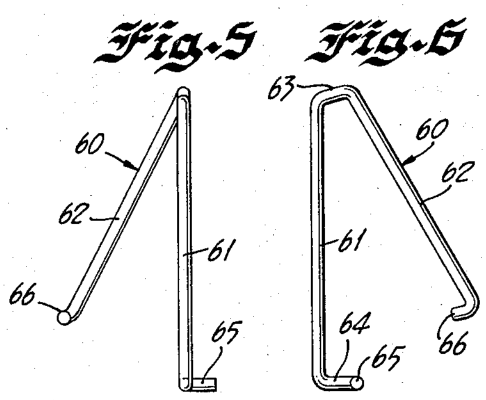
FIG. 5 is a plan view of the resilient clip of the present invention in an unstressed condition.
FIG. 6 is a right-side view of the clip of FIG. 5.
Figure 4:
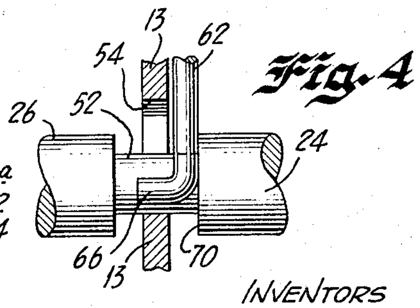
FIG. 4 is a sectional view taken along the lines 4—4 of FIG. 2.

To accomplish this biasing action in two mutually perpendicular directions in a simple and economical manner, a resilient spring clip indicated generally at 60 is provided. The clip 60 is of generally U-shaped configuration and comprises the resilient spring arms 61 and 62 which are interconnected by a bight portion 63. The spring arm 61 is provided with a right-angle end portion 64 which terminates in an upstanding end portion 65. The spring arm 62 is provided with a short right-angle end portion 66. The spring arms 61 and 62 have the relative positions shown in FIGS. 5 and 6 and in dotted lines in FIGS. 1 and 2 when the clip 60 is in an unstressed condition.

Figure 2:
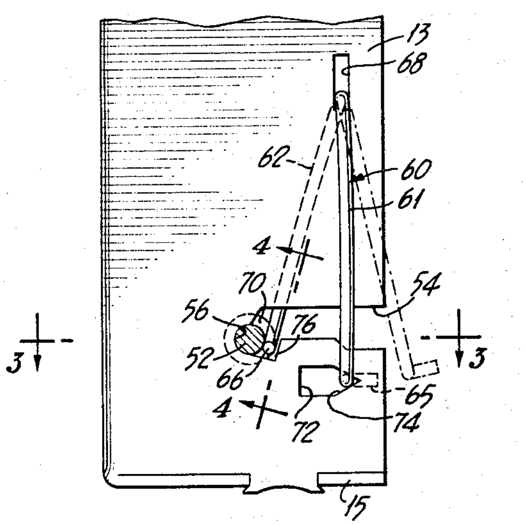
FIG. 2 is a sectional view taken along the line 2—2 of FIG. 1.

The clip 60 is arranged to be mounted on the side wall 13 of the tuner 10 and, to this end, the slot 68 is provided in the wall 13. The arm 62 and end portion 66 are first inserted inwardly through the slot 68 into the compartment 20 until the bight portion 63 is positioned within the slot 68, as shown in FIGS. 1 and 2. The arm portion 62 is then positioned within the compartment 20 so that the end portion 66 is in engagement with the neck portion 52 and the tip of the arm portion 62 engages the shoulder 70 formed in the shaft 24 at the inner edge of the neck portion 52.

In the unstressed condition of the clip 60, the spring arm portion 61 thereof occupies the position shown in dotted lines in FIGS. 1 and 2 when the end portion 66 of the arm 62 is in engagement with the neck portion 52 of the shaft 24. The spring arm 61 is then moved downwardly toward the shaft 24 and inwardly toward the wall 13 by an amount such that the right-angle end portion 65 can be moved into an opening 72 formed in the wall 13. The opening 72 is formed with a V-shaped upper edge 74 and when the end portion 65 of the spring arm 61 has been moved downwardly and into the opening 72 it can be released so that the right-angle portion 64 engages the V portion 74 with the end portion 65 positioned inside the wall 13, as best illustrated in FIG. 1. The spring arm 61 then occupies the position shown in full lines in FIGS. 1 and 2, and it will be seen that the clip 60 has been stressed so that the end portion 66 exerts a downward force on the neck portion 52 and holds this portion against the bearing surface 56. At the same time, the arm 61, by engagement with the shoulder 70, exerts a force along the length of the shaft 24 so that the end portion 50 of this shaft is urged into engagement with the edge of the opening 51 in the wall 14.

In addition to providing the above-described mutually perpendicular biasing forces, the clip 60 is also arranged to positively prevent removal of the shaft 24 from the tuner 10 unless and until the arm portion 61 of the clip 60 is moved to the unstressed condition shown in dotted lines in FIGS. 1 and 2. More particularly, the notch 54 in the wall 13 is provided with a shoulder 76 immediately above the end portion 66 of the arm 62. Accordingly, if an attempt is made to move the shaft 24 upwardly out of the notch 54, the end portion 66 engages the shoulder 76 and positively prevents such removal.

The clip 60 also prevents removal of the shaft 24 by pulling outwardly on the extension portion 26 thereof. Thus, if the extension 26 is pulled to the left, as viewed in FIG. 1, the spring arm 62 will be moved against the inner surface of the wall 13 and since the end portion of the arm 62 is in engagement with the shoulder 70, the spring arm 62 acts as a retainer to prevent removal of the shaft 24 in this direction. In this connection it will be understood that when the clip 60 is in an unstressed condition, the end portion 66 may be readily inserted beneath the shoulder 76 due to the loose connection of the clip 60 with the wall 13 when the arm 62 is initially inserted into the compartment 20.

It should be noted that the arrangement of the present invention which employs the spring mounting clip 60 provides a good electrical ground at either end of the shaft 24. Thus, at the right-hand end of this shaft, the conical point 50 is held into engagement with the edge of the opening 51 by means of the right-hand thrust action of the spring arm 62. Also, the downward force exerted by the end portion 66 on the shaft 24 holds the neck portion 52 in engagement with the bearing surface 56 on the wall 13.

In order to provide an electrical ground at intermediate points along the shaft 24, a spring clip 80 is inserted over the edge of the partition 16 and is provided with an opening adapted to fit into a slot 82 formed in the selector shaft 24. The clip 80 thus provides an intermediate ground by riding on the right-hand shoulder of the slot 82. In a similar manner a U-shaped spring clip 84 is arranged to fit over the edge of the partition 17 and into a similar groove in the shaft 24 so as to provide a ground connection between the compartments 21 and 22 along the shaft 24, as will be readily understood by those skilled in the art. The partition 17 may also be provided with an offset flange 86 terminating in an upstanding portion 88 which may be used to secure the shielding cover (not shown) to the tuner 10. In this connection it is pointed out that the spring clips 80 and 84 are preferably of thin sheet metal and could be deformed so that they would not provide proper grounding action if the shaft were free to move axially. However, due to the above-described retaining action of the clip 60 such deformation is prevented.

Figure 7:
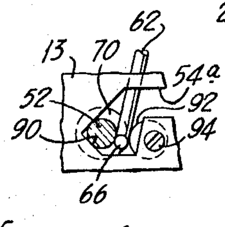
FIG. 7 is a fragmentary view similar to FIG. 2 but illustrating an alternative form of the invention.
Figure 3:
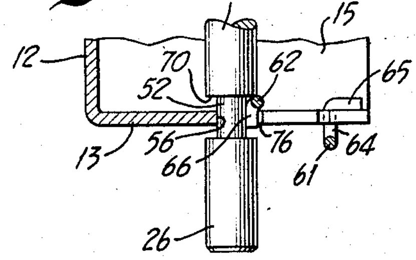
FIG. 3 is a sectional view taken along the line 3—3 of FIG. 2.

In FIG. 7 there is shown an alternative embodiment of the invention. In this embodiment, the bottom portion of the slot 54*a*, which is formed in the wall 13, is provided with a V-shaped bottom portion 90 which is adapted to receive the neck portion 52 of the shaft 24. The V-shaped portion 90 provides opposed bearing surfaces for the neck portion 52 and hence provides an accurate bearing arrangement for the left-hand portion of the shaft 24. Also, in the embodiment of FIG. 7 a different arrangement is employed to restrain the arm portion 62 of the clip 60. Thus, an eccentrically mounted locking plate 92 is pivotally mounted on the inside of the wall 13 adjacent the tip of the arm portion 62. The locking plate may be rotated until the edge thereof is moved into engagement with the arm portion 62, as shown in FIG. 7, and may be locked in this position by any suitable means such as the screw 94. Since the plate 92 may be moved against the arm portion 62 it eliminates the slight clearance between the arm portion 62 and the shoulder 76 in the first embodiment and positively prevents the shaft 24 from being lifted out of the slot 54*a* by application of force to the end portion 26. However, the arm portion 62 still applies biasing forces as described heretoforce and the clip 60 may be readily removed by releasing the arm portion 61 which permits the clip 60 to be moved rearwardly in the slot 68 to free the tip of the arm portion 62. In this connection it will be understood that a fixed stop may be employed instead of the adjustable plate 92, this stop engaging the tip of the arm portion 62 to prevent movement of the shaft 24 after the clip 60 is in place.

While there have been illustrated and described various embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. In a television tuner, a housing having a pair of opposed walls, a tuning shaft, means defining a first bearing surface in one of said walls, means defining a second bearing surface in the other of said walls, a single resilient member having a pair of opposed arm portions, one of said arm portions being positioned in engagement with said shaft in the vicinity of said other wall, and latching means provided on said other arm portion and said other wall for retaining said other arm portion in such position that said one arm portion biases said shaft into engagement with both said first and second bearing surfaces.

2. A tuner as set forth in claim 1, wherein said one arm portion biases said shaft rearwardly into engagement with said first bearing surface and downwardly into engagement with said second bearing surface.

3. A tuner as set forth in claim 1, wherein said shaft is positioned with one end thereof engaging said first bearing surface and extending through said other wall adjacent said second bearing surface.

4. A tuner as set forth in claim 1, wherein said arm portions of said resilient member extend generally parallel to said other wall.

5. A tuner as set forth in claim 1, wherein said arm portions of said resilient member extend generally parallel to said other wall on opposite sides thereof.

6. The combination as set forth in claim 1, including means defining a surface of revolution on one end of said shaft, said shaft being positioned with said surface of revolution in engagement with said first bearing surface and extending through said other wall in the vicinity of said second bearing surface, said other arm portion having an offset end portion, and means for stressing said resilient member so that said offset end portion biases said shaft into engagement with both said first and second bearing surfaces.

7. A tuner as set forth in claim 1, wherein said shaft is provided with a groove portion in the vicinity of said other wall and said one arm portion of said resilient member is positioned in said groove.

References Cited

FOREIGN PATENTS 381,282 10/1964 Switzerland.

MARTIN P. SCHWADRON, *Primary Examiner.*

FRANK SUSKO, *Examiner.*